United States Patent [19]
Bates

[11] Patent Number: 5,855,534
[45] Date of Patent: Jan. 5, 1999

[54] SHIFT CONTROL SYSTEM/METHOD FOR VEHICLE EQUIPPED WITH DRIVELINE RETARDER

[75] Inventor: Ian Richard Joseph Bates, Huddersfield, England

[73] Assignee: Eaton Corporation, Cleveland, Ohio

[21] Appl. No.: 773,122

[22] Filed: Dec. 26, 1996

[30] Foreign Application Priority Data

Jan. 12, 1996 [GB] United Kingdom .................. 9600828
Feb. 20, 1996 [GB] United Kingdom .................. 9603520

[51] Int. Cl.⁶ .................................................. B60K 41/00
[52] U.S. Cl. .............................. 477/120; 477/121; 701/54
[58] Field of Search .................................. 477/107, 120, 477/121; 701/51, 53, 54

[56] References Cited

U.S. PATENT DOCUMENTS

| | | | |
|---|---|---|---|
| 4,361,060 | 11/1982 | Smyth | 74/866 |
| 4,595,986 | 6/1986 | Daubenspeck et al. | 364/424 |
| 4,648,290 | 3/1987 | Dunkley et al. | 74/866 |
| 4,735,109 | 4/1988 | Richards et al. | 74/745 |
| 4,754,665 | 7/1988 | Vandervoort | 74/745 |
| 4,771,657 | 9/1988 | Iwatsuki | 74/866 |
| 4,867,288 | 9/1989 | Simonyi et al. | 192/1.23 |
| 5,193,657 | 3/1993 | Iizuka | 477/186 |
| 5,315,899 | 5/1994 | Mochizuki | 477/186 X |
| 5,335,566 | 8/1994 | Genise et al. | 477/124 |
| 5,351,795 | 10/1994 | Dadel et al. | 477/187 X |
| 5,357,444 | 10/1994 | Ishiguro et al. | 364/426.01 |
| 5,405,301 | 4/1995 | Yagi et al. | 477/120 |
| 5,409,432 | 4/1995 | Steeby | 701/53 X |
| 5,415,604 | 5/1995 | Bates et al. | 477/78 |
| 5,444,623 | 8/1995 | Genise | 477/121 X |
| 5,490,063 | 2/1996 | Genise | 477/120 X |
| 5,595,551 | 1/1997 | Hedstrom et al. | 477/109 |

FOREIGN PATENT DOCUMENTS

| | | |
|---|---|---|
| 0336913 | 10/1989 | European Pat. Off. . |
| 0585989 | 3/1994 | European Pat. Off. . |
| 3827248 | 2/1989 | Germany . |

*Primary Examiner*—Dirk Wright
*Assistant Examiner*—Peter T. Kwon
*Attorney, Agent, or Firm*—Howard D. Gordon

[57] ABSTRACT

A control system and method is provided for controlling shifting of a vehicular powertrain system (10) including an internal combustion engine (12) drivingly coupled to a mechanical change-gear transmission (14) having a transmission output shaft (22) drivingly coupled to vehicular drive wheels (26) and having a driveline retarder (52) associated therewith. To prevent undesirable vehicle acceleration during shift transients occurring when the vehicle is traveling down a grade, input signals indicative of engine torque ($TORQUE_E$) and vehicle acceleration ($dOS/dt$) are sensed and, if engine torque is negative ($TORQUE_E < REF_1$) and vehicle acceleration is positive ($dOS/dt > REF_2$), the retarder is caused to apply an increased level of retarding torque to the vehicle drive wheels.

29 Claims, 3 Drawing Sheets

SHIFT CONTROL SYSTEM/METHOD FOR VEHICLE EQUIPPED WITH DRIVELINE RETARDER

RELATED APPLICATIONS

This application is related to and claims priority from British Pat. Apps. No. 9600828.9, filed Jan. 12, 1996, and 9603520.9 filed Feb. 12, 1996, both assigned to EATON CORPORATION, the assignee of this application.

BACKGROUND OF THE INVENTION

1. Field of the Invention

The present invention relates to a shift control system/method for shifting a fully or partially automated mechanical transmission in a vehicle equipped with a driveline retarder located interposed between the clutches of the transmission and the vehicle final drive mechanism. In particular, the present invention relates to a shift control system/method of the type described for minimizing or eliminating the tendency of such vehicles to undesirably accelerate during a shift transient if shifting on a downgrade.

2. Description of the Prior Art

Mechanical change-gear vehicular transmissions which utilize positive jaw clutches, of both synchronized and non-synchronized types, to selectively engage and disengage target gear ratios are well known in the prior art, as may be seen by reference to U.S. Pat. Nos. 3,105,395; 3,799,022; 4,754,665; 5,086,897; 5,285,694 and 5,370,013, the disclosures of which are incorporated herein by reference.

Vehicular fully or partially automated mechanical transmission systems also are well known in the prior art, as may be seen by reference to U.S. Pat. Nos. 4,361,060; 4,595,986; 4,648,290; 4,736,109; 5,335,566 and 5,415,604, the disclosures of which are incorporated herein by reference.

While widely used and highly commercially successful, a potential drawback of mechanical transmissions is that at least a momentary torque break will occur during manual and/or automatic shift transients as the jaw clutches are disengaged and then engaged and/or as the master friction clutch and/or a torque converter disconnect clutch is disengaged and then reengaged. If a shift into a target gear ratio is attempted on a downgrade, especially a steep downgrade, and the vehicle gains speed during the torque break portion of the shift transient, this can be somewhat annoying and/or disconcerting to a vehicle operator

SUMMARY OF THE INVENTION

In accordance with the present invention, the drawbacks of the prior art are minimized by the provision of an automated mechanical control system/method, for a vehicle equipped with a driveline retarder located downstream of the transmission clutches, which will minimize undesirable vehicle acceleration during downgrade shift transients. The foregoing is accomplished by sensing an actual or impending initiation of a shift operation at negative engine torque conditions and, in response thereto, applying or increasing the retarding effect of the retarder. Thereafter, vehicle speed during the shift transient is sensed and, assuming continuing negative engine torque conditions, the retarding effect of the retarder is increased and decreased, respectively, in response to sensed vehicle acceleration or deceleration, respectively. Upon completion of the shift, the retarder is returned to its initial level of retarding effort.

Accordingly, it is an object of the present invention to provide a new and improved control for an automated mechanical transmission system utilized in a vehicle equipped with a driveline retarder.

This and other objects and advantages of the present invention will become apparent from a reading of the detailed description of the preferred embodiment taken in connection with the drawings.

DESCRIPTION OF THE PREFERRED EMBODIMENT

Certain terminology will be used in the following description of the preferred embodiment for convenience and reference only and will not be limiting. The term "mechanical transmission" refers to a change-gear vehicular transmission of the type utilizing positive clutches (such as jaw clutches) to selectively engage and disengage gears and shafts to other gears and shafts. Such transmissions, utilizing both synchronized and non-synchronized jaw clutches, are well known in the prior art, as may be seen by reference to aforementioned U.S. Pat. Nos. 3,105,395; 3,799,022; 4,754, 665; 5,086,897; 5,285,694 and 5,370,013. The term "driveline retarder" refers to a selectively actuatable device for applying a retarding force or torque, usually a selectively variable retarding force or torque, to the final drive elements of a vehicle. Such devices are mounted interposed between the transmission jaw clutches and the vehicle drive wheels such that disengagement of the vehicle master clutch and/or causing the transmission to be shifted to neutral will not interrupt the retarder retardation of the vehicle final drive elements. Driveline retarders may be of the hydrodynamic type, the friction type or the like. The vehicle brake systems also may be utilized to provide a driveline retarder function. Said terminology will include the words above specifically mentioned, derivatives thereof and words of similar import.

Figure 1:
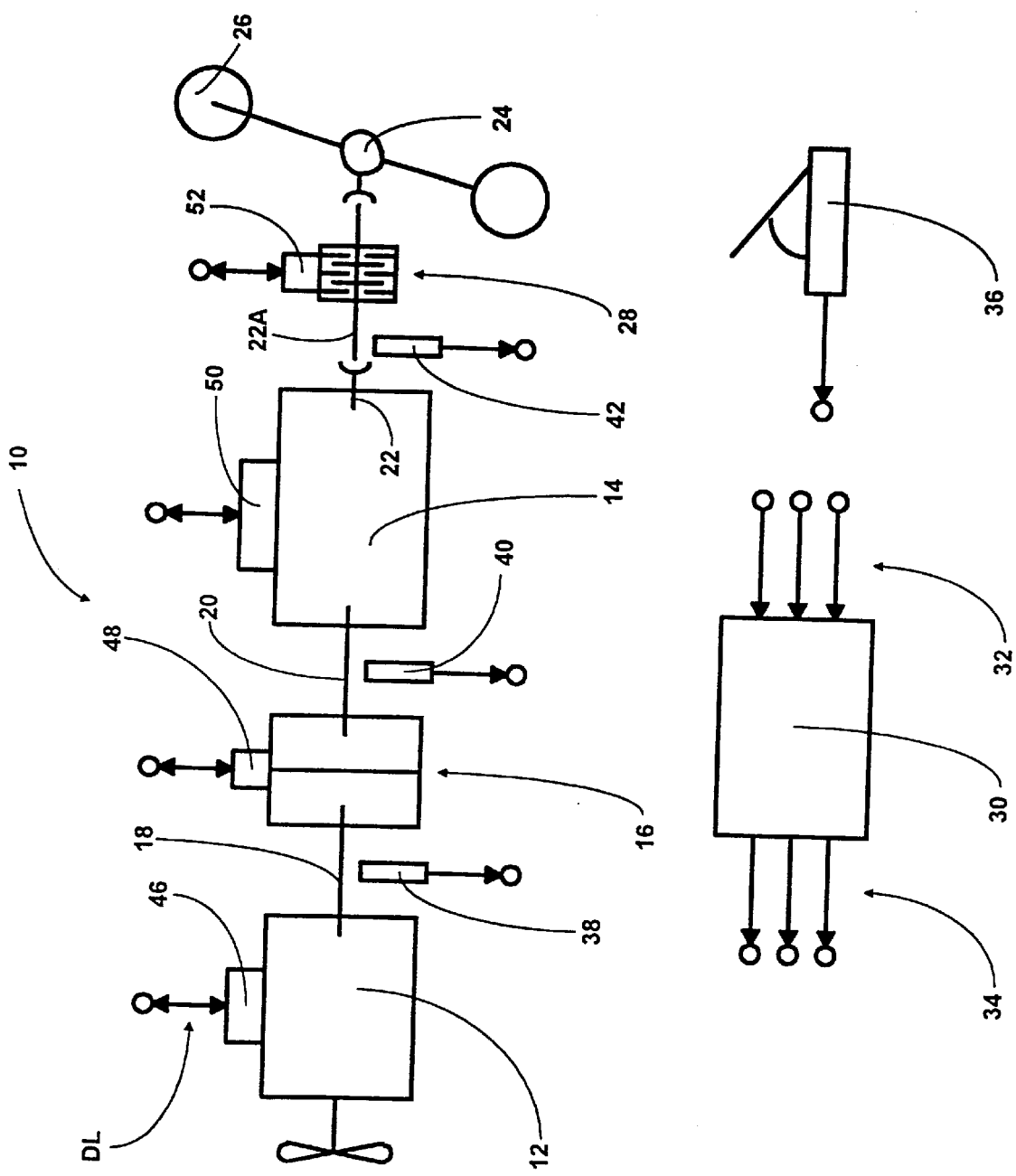
FIG. 1 is a schematic illustration of a vehicular powertrain of the type utilizing the shift control system/method of the present invention.

A vehicular powertrain 10 of the type advantageously utilizing the shift control method/system of the present invention may be seen by reference to FIG. 1. The vehicular powertrain system includes a fuel-controlled engine 12 (such as a diesel engine or the like) which is drivingly connected to a change-gear transmission 14 by means of a selectively engageable and disengageable non-positive coupling 16 (such as a master clutch or the like). The engine 12 includes an output shaft or crankshaft 18 which may be selectively, drivingly engaged and disengaged from a transmission input shaft 20 by means of the non-positive coupling 16. The transmission input shaft 20 is selectively, drivingly coupled to the transmission output shaft 22 by means of transmission gear, shafts and positive clutches, as is well known in the prior art. The transmission output shaft 22 is coupled to a vehicular final drive assembly 24 (such as a rear drive axle or transfer case) for providing driving torque to the vehicular drive wheels 26. Typically, a drive shaft 22A is connected by universal joints or the like to transmission output shaft 22 and the drive axle 24. Vehicle final drive mechanisms such as rear drive axles, front steer axles, power dividers and transfer cases are well known in the prior art, as may be seen by reference to U.S. Pat. Nos. 3,929,200; 4,018,097 and 4,050,328, the disclosures of which are incorporated herein by reference.

The powertrain 10 additionally includes a driveline retarder 28 for applying a retarding torque to the vehicle drive wheels 26. As may be seen, the retarder 28 is located in the drivetrain interposed the transmission clutches and the vehicle drive wheels such that disengagement of the master clutch 16 and/or transmission 14 will not interrupt the retarding torque applied to the drive wheels 26 by the retarder 28. The use of such driveline retarders, especially for passenger-carrying vehicles such as buses, is encouraged and/or recommended by the laws and regulations of various countries of the world such as, for example, EC Directive EEC/71/320. The retarder 28 is typically of a hydrodynamic or a friction plate construction and is intended to act as a supplement to the vehicle foundation brakes. The Voith R115 Retarder and the TELMA Inline Retarder are examples of such retarders. Alternatively, the vehicle foundation brake system may be utilized to provide a retarding force to the vehicle independent of the vehicle operator's operation of his brake treadle pedal.

The vehicular powertrain system 10 illustrated in FIG. 1 includes an electronic control unit 30 which preferably is microprocessor-based and includes means for receiving input signals 32 and for processing same according to predetermined logic rules to issue command output signals 34 to various system actuators. Control units of this type are well known in the prior art and may be appreciated in greater detail by reference to aforementioned U.S. Pat. No. 4,595,986. The central processing unit 30 receives input signals 32 from a throttle position sensor 36, an engine speed sensor 38, an input shaft speed sensor 40, and an output shaft rotational speed sensor 42. The controller 30 also receives information from an engine controller 46, preferably over an electronic data link DL of the type conforming to one or more industry-established communication protocols, such as SAE J-1922, SAE J-1939 and/or ISO 11898. The controller 30 is effective to process the input signals and/or stored information according to predetermined logic rules, such as a computer program product stored on a computer-usable medium, such as a floppy disk, hard drive, CD-ROM, tape or other internal or external storage medium, and to issue command output signals 34 to the various system actuators, such as the engine controller 46, a clutch controller 48, a transmission operator 50 or a retarder operator 52. As may be seen, the various system actuators also may provide input signals back to the controller 30 indicative of the states of operation thereof.

Retarder 52, preferably, is capable of operating at one or more levels of retardation ranging from an inactive state (where little or no retarding torque is applied to the drive wheels 26) progressively to a maximum state of applying retarding torque to the drive wheels 26. Alternatively, the retarder may be capable of providing a continuously variable level of retarding torque.

As previously indicated, in automated mechanical transmission systems of the type illustrated, if a shift into a target gear ratio (GR$_T$) is attempted with the vehicle descending a relatively steep grade, during the period of time during which the master clutch 16 is disengaged and/or the transmission 14 is disengaged and/or in neutral, the vehicle will tend to accelerate, which may be objectionable and/or disconcerting to the vehicle operator. To minimize or eliminate this drawback, the control method/system of the present invention utilizes the vehicle retarder 28 to provide a retarding torque to the vehicle drive wheels in operating conditions predetermined to be indicative of vehicle operating conditions under which vehicle acceleration will be objectionable.

Figure 2A:
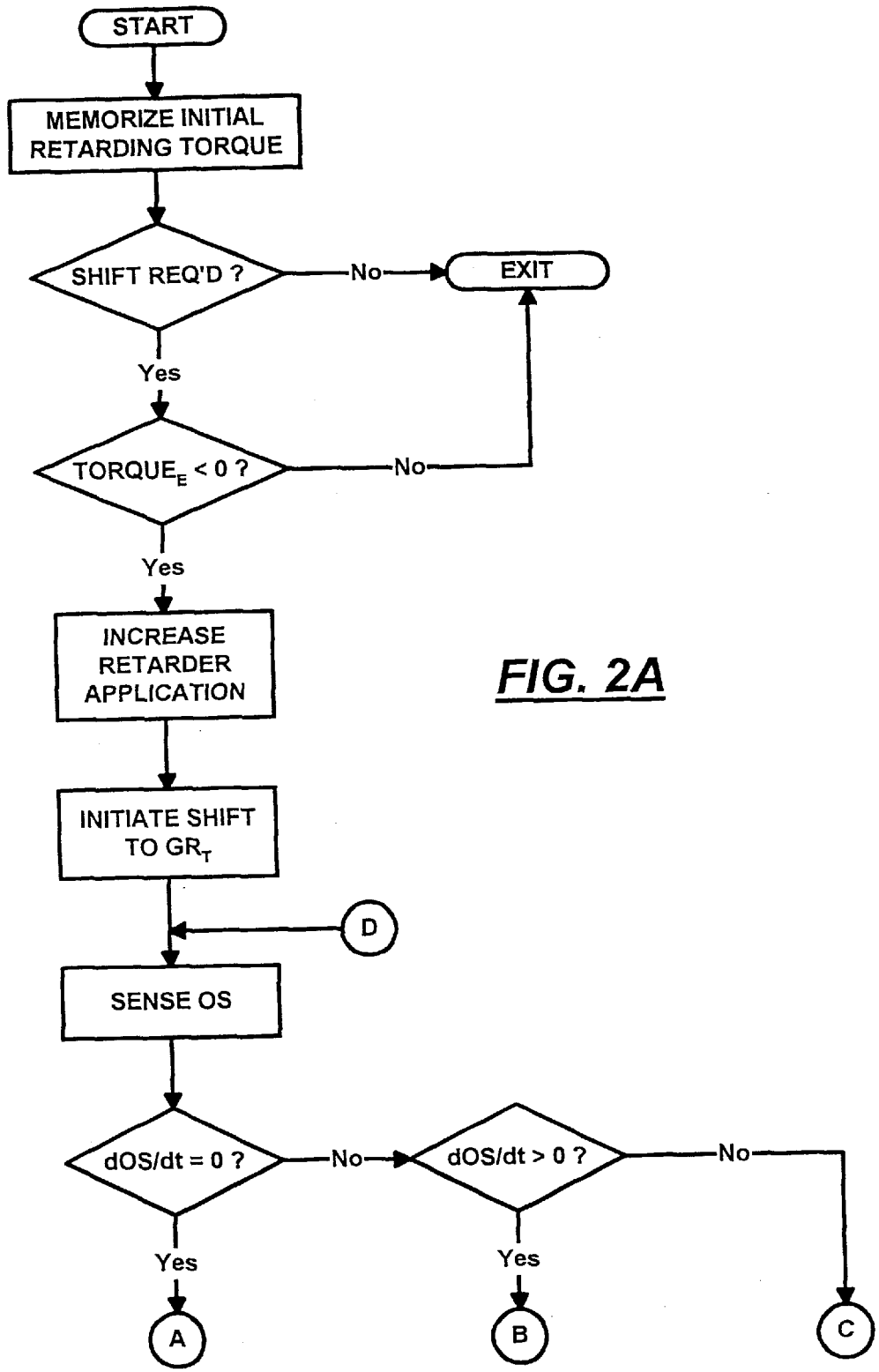
FIGS. 2A and 2B are schematic representations, in flow chart format, of the shift control system/method of the present invention.
Figure 2B:
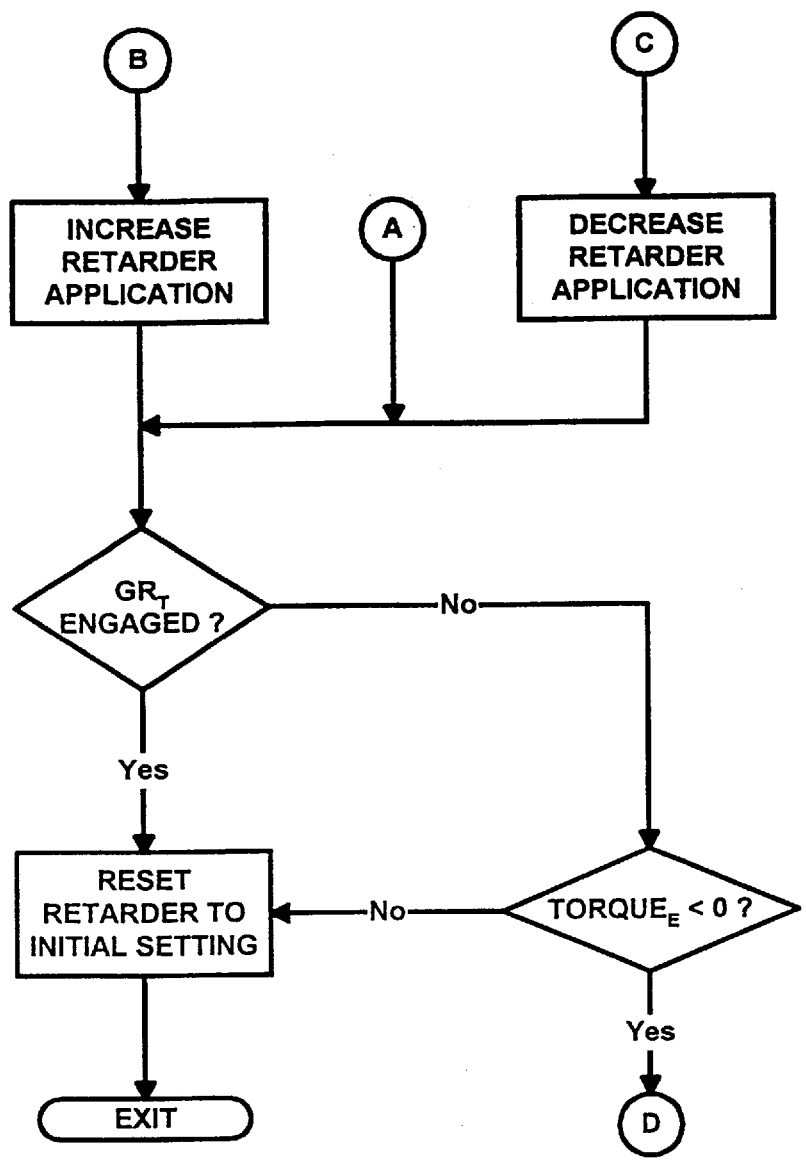

The control system/method of the present invention is schematically illustrated, in flow chart format, in FIGS. 2A and 2B. Upon determination that a shift into a target gear ratio is required, it is determined if the engine torque at the engine crankshaft 18 is positive or negative. If the engine torque at crankshaft 18 is negative (TORQUE$_E$<REF$_1$), this is indicative that the vehicle is coasting and that the drive wheels 26 are driving the engine 12 through the transmission 14 and clutch 16. Such conditions are indicative of the possibility of the vehicle descending a grade. Preferably, the vehicle will be equipped with an electronic data link DL which will carry information relative to the current torque output of the engine 12. Alternatively, a zero throttle position may be taken as an indication of a negative engine output torque. As a further alternative, a separate engine output torque sensor (not shown) may be utilized to provide a signal indicative of engine output torque to the controller 30.

If it is determined that the engine torque is negative at the initiation of a shift, the retarder will be caused to apply an increased level of retardation prior to or at initiation of a transmission shift. Typically, such a transmission shift will include a disengagement of the master clutch 16 for purposes of disengaging a currently engaged gear ratio and/or for engaging the target gear ratio upon achievement of synchronization. Alternatively, it is known that some transmissions may be shifted without requiring disengagement of the master clutch, as is seen by reference to aforementioned U.S. Pat. No. 5,335,566. Preferably, the retarder is caused to increase its retardation level prior to initiation of a shift into the target gear ratio with a lead time determined as a function of the relatively slow reaction time associated with retarders, as compared to master clutches and other transmission devices.

Upon initiation of the shift into the target gear ratio, an input signal, preferably the rotational speed of the output shaft, is sensed and differentiated with respect to time to monitor the acceleration (dOS/dt) of the vehicle. If the vehicle ground speed remains substantially constant, the retarder is maintained at its current level of retardation. If the vehicle is sensed to be accelerating (dOS/dt>REF$_2$), the retarder is caused to increase its level of retardation, and if the vehicle is sensed to be decelerating (dOS/dt<REF$_3$), the retarder is caused to decrease its level of retardation. If the retarder is applying a maximum or minimum level of retarding torque, respectively, increasing or decreasing the level of retarding torque, respectively, will comprise maintaining that maximum or minimum level, respectively. This activity is continued until such time as the target gear ratio is engaged or the engine torque becomes positive. At such time, the retarder is reset to its initial level of retardation prior to initiation of the shift into the target gear ratio.

Accordingly, it may be seen that a shift control is provided for a vehicular powertrain 10 including an automated mechanical transmission system and utilized in a vehicle having a driveline retarder which will minimize the tendency for the vehicle to undesirably accelerate during a shift transient while traveling down an incline.

Although the preferred embodiment of the present invention has been described with a certain degree of particularity, various changes to form and detail may be made without departing from the spirit and scope of the invention as hereinafter claimed.

I claim:

1. A method for controlling shifting of an automated vehicular powertrain system (10) comprising a fuel-controlled engine (12) drivingly coupled to a multiple-speed mechanical transmission (14) having an output shaft (22)

drivingly coupled to vehicular drive wheels (26), a driveline retarder (28) effective to apply a selective level of retarding torque to said drive wheels, and a control unit (30) for receiving input signals (32) including an input signal indicative of engine torque and an input signal indicative of vehicle acceleration and for processing same in accordance with predetermined logic rules to issue command output signals (34) to system actuators including a transmission actuator (50) and a retarder actuator (52), said method characterized by:

during a shift of said transmission into engine torque ratio ($GR_T$), if engine torque is determined to be less than a first predetermined reference value ($TORQUE_E < REF_1$) and vehicle acceleration is greater than a second reference value ($dOS/dt > REF_2$), causing the retarder to apply increased retarding torque to said drive wheels.

2. The method of claim 1 wherein, during a shift into said target gear ratio, if engine torque is less than said first reference value and vehicle acceleration is less than a third reference value ($dOS/dt < REF_3$), causing the retarder to apply a decreased retarding torque to said drive wheels.

3. The method of claim 1 further comprising memorizing the initial level of retarding torque applied by said retarder at the time of initiation of a shift into said target gear ratio and, upon completion of a shift into said target gear ratio, causing said retarder to apply said initial level of retarding torque to said drive wheels.

4. The method of claim 2 further comprising memorizing the initial level of retarding torque applied by said retarder at the time of initiation of a shift into said target gear ratio and, upon completion of a shift into said target gear ratio, causing said retarder to apply said initial level of retarding torque to said drive wheels.

5. The method of claim 1 additionally comprising, prior to initiation of a shift into a target gear ratio, if engine torque is less than said first reference value and vehicle acceleration is greater than said second reference value, causing said retarder to apply an increased level of retarding torque to said drive wheels prior to initiation of said shift into said target gear ratio.

6. The method of claim 2 additionally comprising, prior to initiation of a shift into a target gear ratio, if engine torque is less than said first reference value and vehicle acceleration is greater than said second reference value, causing said retarder to apply an increased level of retarding torque to said drive wheels prior to initiation of said shift into said target gear ratio.

7. The method of claims 1, 2, 3, 4, 5 or 6 wherein said vehicle is provided with an electronic data link (DL) carrying data indicative of engine torque.

8. The method of claims 1, 2, 3, 4, 5 or 6 wherein said vehicle is provided with a sensor (36) for providing a signal indicative of operator displacement of a fuel throttle control device, the magnitude of said signal being taken as an indication of the current engine torque.

9. The method of claims 1, 2, 3, 4, 5 or 6 wherein said first reference value ($REF_1$) is equal to approximately zero torque.

10. The method of claims 1, 2, 3, 4, 5 or 6 wherein said second reference value ($REF_2$) and said third reference value ($REF_3$) are substantially equal and are substantially equal to zero vehicle acceleration.

11. The method of claims 1, 2, 3, 4, 5 or 6 wherein said driveline retarder acts directly on said transmission output shaft.

12. The method of claims 1, 2, 3, 4, 5 or 6 wherein said driveline retarder acts directly on a shaft (22A) fixed for rotation with said transmission output shaft.

13. A control system for controlling shifting of an automated vehicular powertrain system (10) comprising a fuel-controlled engine (12) drivingly coupled to a multiple-speed mechanical transmission (14) having an output shaft (22) drivingly coupled to vehicular drive wheels (26) and a driveline retarder (28) effective to apply a selective level of retarding torque to said drive wheels, said control system including a control unit (30) for receiving input signals (32) including an input signal indicative of engine torque and an input signal indicative of vehicle acceleration and for processing same in accordance with predetermined logic rules to issue command output signals (34) to powertrain system actuators including a transmission actuator (50) and a retarder actuator (52), said control system characterized by said control unit operating under logic rules for:

during a shift of said transmission into a target gear ratio ($GR_T$), if engine torque is determined to be less than a first predetermined reference value and vehicle acceleration is greater than a second reference value, causing the retarder to apply increased retarding torque to said drive wheels.

14. The control system of claim 13 wherein said logic rules are additionally effective, during a shift into said target gear ratio, if engine torque is less than said first reference value and vehicle acceleration is less than a third reference value, for causing the retarder to apply a decreased retarding torque to said drive wheels.

15. The control system of claim 13 wherein said logic rules are additionally effective for memorizing the initial level of retarding torque applied by said retarder at the time of initiation of a shift into said target gear ratio and, upon completion of a shift into said target gear ratio, for causing said retarder to apply said initial level of retarding torque to said drive wheels.

16. The control system of claim 14 wherein said logic rules are additionally effective for memorizing the initial level of retarding torque applied by said retarder at the time of initiation of a shift into said target gear ratio and, upon completion of a shift into said target gear ratio, causing said retarder to apply said initial level of retarding torque to said drive wheels.

17. The control system of claim 13 wherein said logic rules are additionally effective, prior to initiation of a shift into a target gear ratio, if engine torque is less than said first reference value and vehicle acceleration is greater than said second reference value, for causing said retarder to apply an increased level of retarding torque to said drive wheels prior to initiation of said shift into said target gear ratio.

18. The control system of claim 14 wherein said logic rules are additionally effective, prior to initiation of a shift into a target gear ratio, if engine torque is less than said first reference value and vehicle acceleration is greater than said second reference value, for causing said retarder to apply an increased level of retarding torque to said drive wheels prior to initiation of said shift into said target gear ratio.

19. The control system of claims 13, 14, 15, 16, 17 or 18 wherein said vehicle is provided with an electronic data link (DL) carrying data indicative of engine torque.

20. The control system of claims 13, 14, 15, 16, 17 or 18 wherein said vehicle is provided with a sensor for providing a signal indicative of operator displacement of a fuel throttle control device, the magnitude of said signal being taken as an indication of the current engine torque.

21. The control system of claims 13, 14, 15, 16, 17 or 18 wherein said first reference value is equal to approximately zero torque.

22. The control system of claims 13, 14, 15, 16, 17 or 18 wherein said second reference value and said third reference value are substantially equal and are substantially equal to zero vehicle acceleration.

23. The control system of claims 13, 14, 15, 16, 17 or 18 wherein said driveline retarder acts directly on a shaft fixed for rotation with said transmission output shaft.

24. A computer program for use with a computer-based onboard control unit for controlling shifting of an automated vehicular powertrain system comprising a fuel-controlled engine drivingly coupled to a multiple-speed mechanical transmission having an output shaft drivingly coupled to vehicular drive wheels, and a driveline retarder effective to apply a selective level of retarding torque to said drive wheels, said control unit having means for receiving input signals including an input signal indicative of engine torque and an input signal indicative of vehicle acceleration and for processing same in accordance with predetermined logic rules defined by said computer program to issue command output signals to system actuators including a transmission actuator and a retarder actuator, said computer program stored on a computer-usable medium and characterized by defining logic rules for:

causing a determination of engine torque and vehicle acceleration; and during a shift of said transmission into a target gear ratio ($GR_T$), if engine torque is determined to be less than a first predetermined reference value ($TORQUE_E < REF_1$) and vehicle acceleration is greater than a second reference value ($dOS/dt > REF_2$), causing the retarder to apply increased retarding torque to said drive wheels.

25. The computer program of claim 24 additionally defining logic rules for causing, during a shift into said target gear ratio, if engine torque is less than said first reference value and vehicle acceleration is less than a third reference value ($dOS/dt < REF_3$), the retarder to apply a decreased retarding torque to said drive wheels.

26. The computer program product of claim 24 additionally defining logic rules for causing memorizing of the initial level of retarding torque applied by said retarder at the time of initiation of a shift into said target gear ratio and, upon completion of a shift into said target gear ratio, causing said retarder to apply said initial level of retarding torque to said drive wheels.

27. The computer program product of claim 24 additionally defining logic rules for causing memorizing of the initial level of retarding torque applied by said retarder at the time of initiation of a shift into said target gear ratio and, upon completion of a shift into said target gear ratio, causing said retarder to apply said initial level of retarding torque to said drive wheels.

28. The computer program product of claim 24 additionally defining logic rules for causing, prior to initiation of a shift into a target gear ratio, if engine torque is less than said first reference value and vehicle acceleration is greater than said second reference value, said retarder to apply an increased level of retarding torque to said drive wheels prior to initiation of said shift into said target gear ratio.

29. The computer program product of claim 25 additionally defining logic rules for causing, prior to initiation of a shift into a target gear ratio, if engine torque is less than said first reference value and vehicle acceleration is greater than said second reference value, said retarder to apply an increased level of retarding torque to said drive wheels prior to initiation of said shift into said target gear ratio.

* * * * *